United States Patent [19]
Richards et al.

[11] Patent Number: 5,755,264
[45] Date of Patent: May 26, 1998

[54] VEHICLE FOR TRANSPORTING LIQUID AND SEMI-LIQUID HAZARDOUS/NON-HAZARDOUS MATERIAL

[75] Inventors: Jerry Richards; Manikkam Madheswaran, both of Birmingham, Ala.

[73] Assignee: Guzzler Manufacturing, Inc., Birmingham, Ala.

[21] Appl. No.: 780,293

[22] Filed: Jan. 8, 1997

[51] Int. Cl.$^6$ ............................................. A01G 25/09
[52] U.S. Cl. ................... 137/899; 280/838; 280/830; 137/590
[58] Field of Search ............. 137/899, 351, 137/267, 571, 590, 355.16; 280/838, 830, 832; 210/534

[56] References Cited

U.S. PATENT DOCUMENTS

| | | |
|---|---|---|
| 2,008,858 | 7/1935 | French . |
| 2,033,457 | 3/1936 | Davis, Jr. . |
| 2,048,454 | 7/1936 | Kizer . |
| 2,067,994 | 1/1937 | Thwaits . |
| 2,242,535 | 5/1941 | Mika . |
| 2,297,840 | 10/1942 | Pfeiffer . |
| 3,310,070 | 3/1967 | Black . |
| 4,135,596 | 1/1979 | Silba ............................ 137/355.16 |
| 4,344,636 | 8/1982 | Van Der Lely ........................ 137/571 |
| 4,771,503 | 9/1988 | Urbani ..................... 210/534 |
| 4,789,170 | 12/1988 | Reber ......................... 137/267 |
| 4,924,897 | 5/1990 | Brown ............................ 137/590 |
| 5,071,166 | 12/1991 | Marino . |
| 5,097,976 | 3/1992 | Zink . |
| 5,240,043 | 8/1993 | Campbell ............................ 137/899 |
| 5,415,316 | 5/1995 | Pemberton . |

OTHER PUBLICATIONS

Keith Huber, Inc. *The Dominator*™ Perfection Is Standard (not dated).
Presvac Systems Burlington, Limited, *Waste Removal Systems*, Mar. 1995.
Ibex Industries, Inc., *IBEX FC Models*. (not dated).
Red Valve Company, Inc., *Pneumatic Actuated Flexgate®*, (not dated)—two pages.
Guzzler, *Predator*, truck vacuum system (not dated).

*Primary Examiner*—Denise L. Ferensic
*Assistant Examiner*—John Ball
*Attorney, Agent, or Firm*—Finnegan, Henderson, Farabow, Garrett & Dunner, L.L.P.

[57] ABSTRACT

A vehicle for transporting waste material comprising: a support bed; a tank mounted above the support bed for receiving the waste material; a system for generating vacuum and pressure within the tank; an air conduit system; a waste loading system; and a waste discharge system for expelling the waste material from the tank.

22 Claims, 7 Drawing Sheets

VEHICLE FOR TRANSPORTING LIQUID AND SEMI-LIQUID HAZARDOUS/NON-HAZARDOUS MATERIAL

BACKGROUND OF THE INVENTION

1. Field of the Invention

The present invention generally relates to vehicles for transporting liquid and semi-liquid material. More particularly, the invention relates to vehicles used to clean up sites containing hazardous and non-hazardous waste materials which typically are in a liquid or semi-liquid state.

2. Description of the Related Art

For the purposes of this invention, the terms "waste" or "waste material" relate to liquid material, semi-liquid material containing solid waste elements, as well as material in a substantially solid state. The waste material may be of a hazardous or non-hazardous nature.

Conventional vehicles for transporting hazardous and nonhazardous waste materials typically include tank assemblies having piping protruding from the top and/or sides of the vehicles. Public outcry over environmental issues, particularly in recent years, has led manufacturers of such vehicles to provide protection for exposed waste material piping to reduce the risk of spillage caused by damage to the piping. Indeed, federal regulations now require roll over protection for manways and valves protruding from the top of tank assemblies carrying hazardous, as well as non-hazardous waste material. In addition, vehicles with waste material piping and valves protruding from the sides, such as along the rear tailgate or the welded rear head (i.e., for tanks that do not open at the rear), may require extensive rear and bottom damage protection to protect the protruding elements from damage in the event of a collision.

The protection required by the federal government to safeguard against spillage from broken external piping and manways is difficult to fabricate for many vehicles. It also adds significant weight, which in turn affects the manufacturing and operational cost of the vehicle. In addition, the required protective features greatly reduce the payload these vehicles can transport. Moreover, modifying vehicles to include rollover, rear end and bottom protection in order to comply with federal regulations, does not guarantee that external piping will be adequately protected from damage.

SUMMARY OF THE INVENTION

To overcome the disadvantages of the prior art, and in accordance with the purposes of the invention, as embodied and broadly described herein, there is provided a vehicle for transporting liquid and semi-liquid material comprising: a support bed; a tank mounted above the support bed for receiving waste material; a system for generating vacuum and pressure; an air conduit system; a waste loading system; and a waste discharge system for expelling waste from the tank.

In accordance with the present invention, the tank includes an outer wall and a containment zone for the waste material within the outer wall. The outer wall includes top and bottom surfaces, whereby the bottom surface is normally disposed substantially adjacent the support bed, and the top surface and the containment zone define a separation zone therebetween.

In accordance with the present invention, the system for generating vacuum and pressure, which preferably is a vacuum/pressure pump, is disposed externally of the tank for selectively controlling pressure and vacuum within the containment zone. The air conduit system provides fluid communication between the vacuum/pressure pump and the containment zone of the tank. The air conduit system includes an external air conduit connecting the tank to the pressure control device. The external air conduit protrudes from the bottom surface. The air conduit system also includes an internal air conduit in fluid communication with the external conduit. The internal conduit extends from the bottom surface of the tank to the separation zone.

In accordance with the present invention, the material loading system draws material into the tank and is responsive to vacuum created in the tank as a result of cooperation between the air conduit system and the vacuum/pressure pump. The material loading system includes an external material conduit protruding from the bottom of the surface of the tank. The material loading system also includes an internal material conduit in fluid communication with the external conduit. The internal material conduit extends from the bottom surface to the separation zone.

Preferably, the support bed defines open areas for receiving and protecting the external air conduit and the internal air conduit, thereby substantially minimizing the likelihood that these conduits will be exposed to direct or indirect impact in the event of a collision.

In accordance with the present invention, the tank preferably is substantially cylindrical and the bottom surface occupies a bottom one-third of the circumference of the tank. The tank also may include a tailgate pivotally connected along the upper surface. In addition, the tank preferably is pivotally mounted on the support bed of the vehicle. In addition, the present invention may include a hydraulic lift or other lifting device connected at one end of the tank for raising and lowering the tank relative to the bottom surface.

In accordance with the present invention, the tank preferably includes overfill protection in the form of a shut-off valve disposed in cooperation with the internal air conduit to prevent material from damaging the vacuum/pressure pump. The separation zone also includes a relief valve for relieving excess pressure within the tank.

Preferably, the waste discharge system includes an air-actuated gate valve formed of corrosion resistant material, such as stainless steel.

BRIEF DESCRIPTION OF THE DRAWINGS

The accompanying drawings, which are incorporated in and constitute part of the specification, illustrate a presently preferred embodiment of the invention and, together with the general description given above and detailed description of the preferred embodiment given below, serve to explain the principles of the invention.

DESCRIPTION OF THE PREFERRED EMBODIMENTS

Reference will now be made in detail to the present preferred embodiments of the invention as illustrated in the accompanying drawings.

Figure 1:
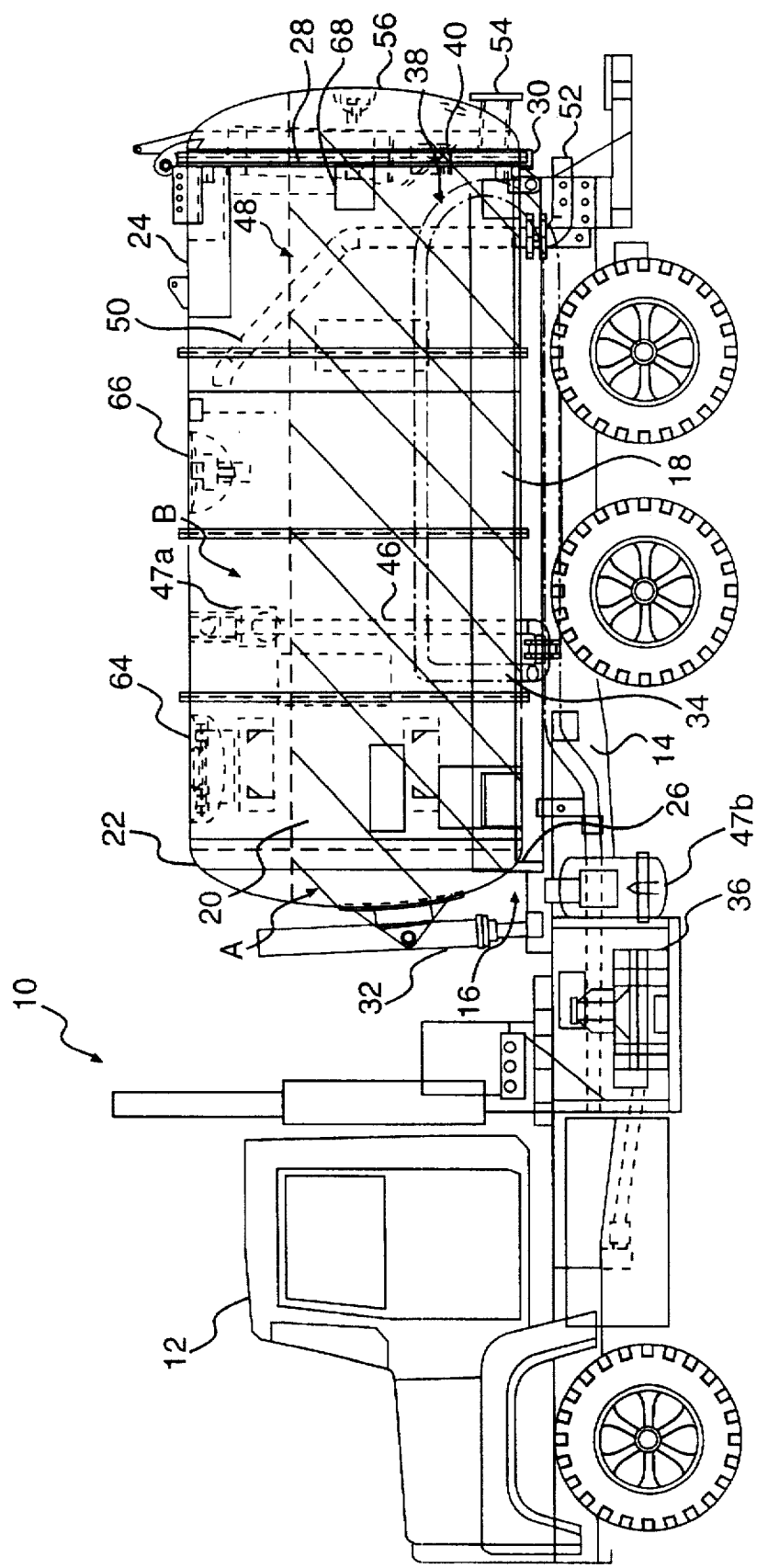
FIG. 1 is a side view of the vehicle of the present invention having the tank seated on a support bed.
Figure 2:
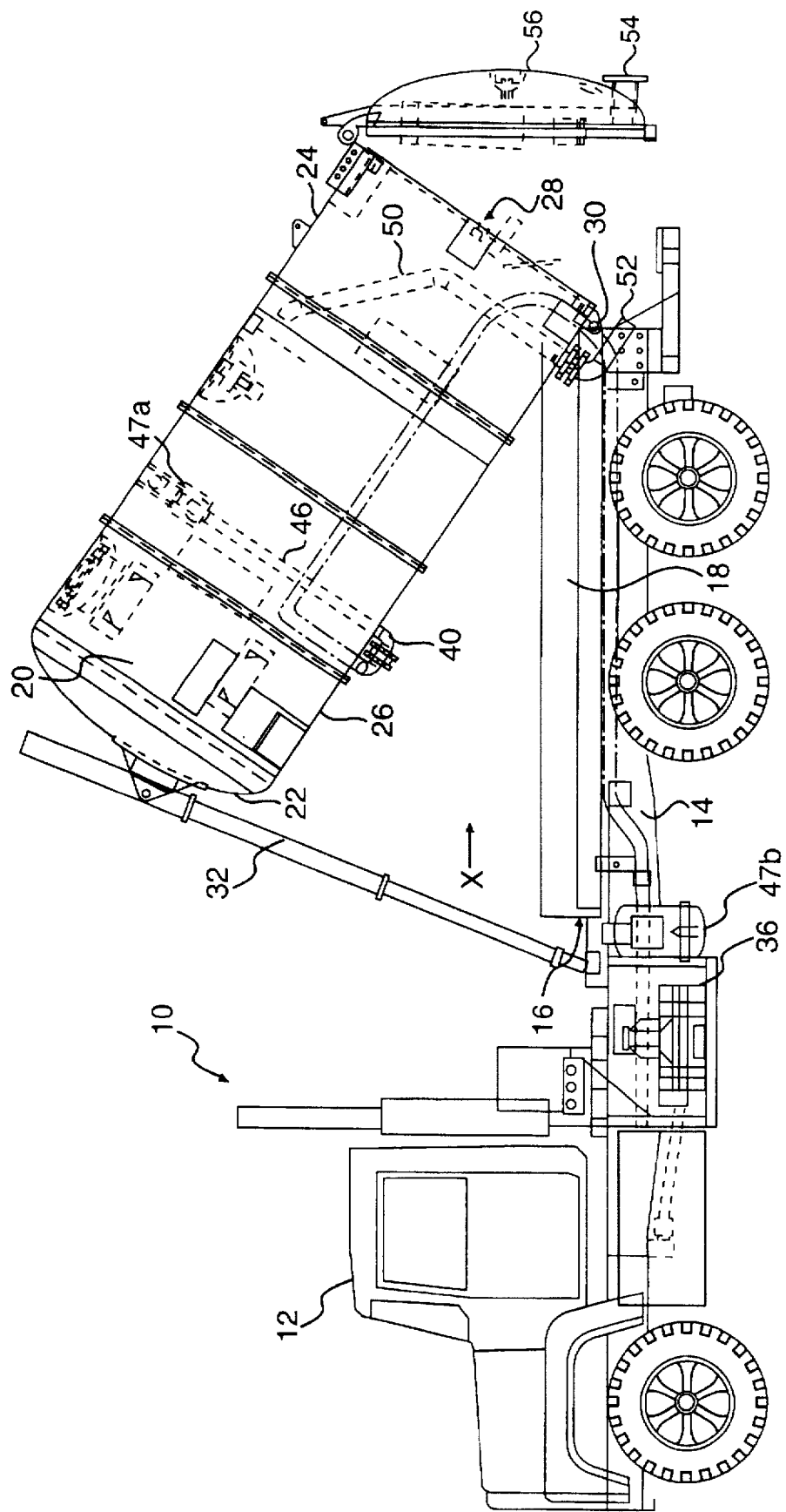
FIG. 2 is a side view of the vehicle in FIG. 1 with the tank pivotally raised above the support bed.
Figure 3:
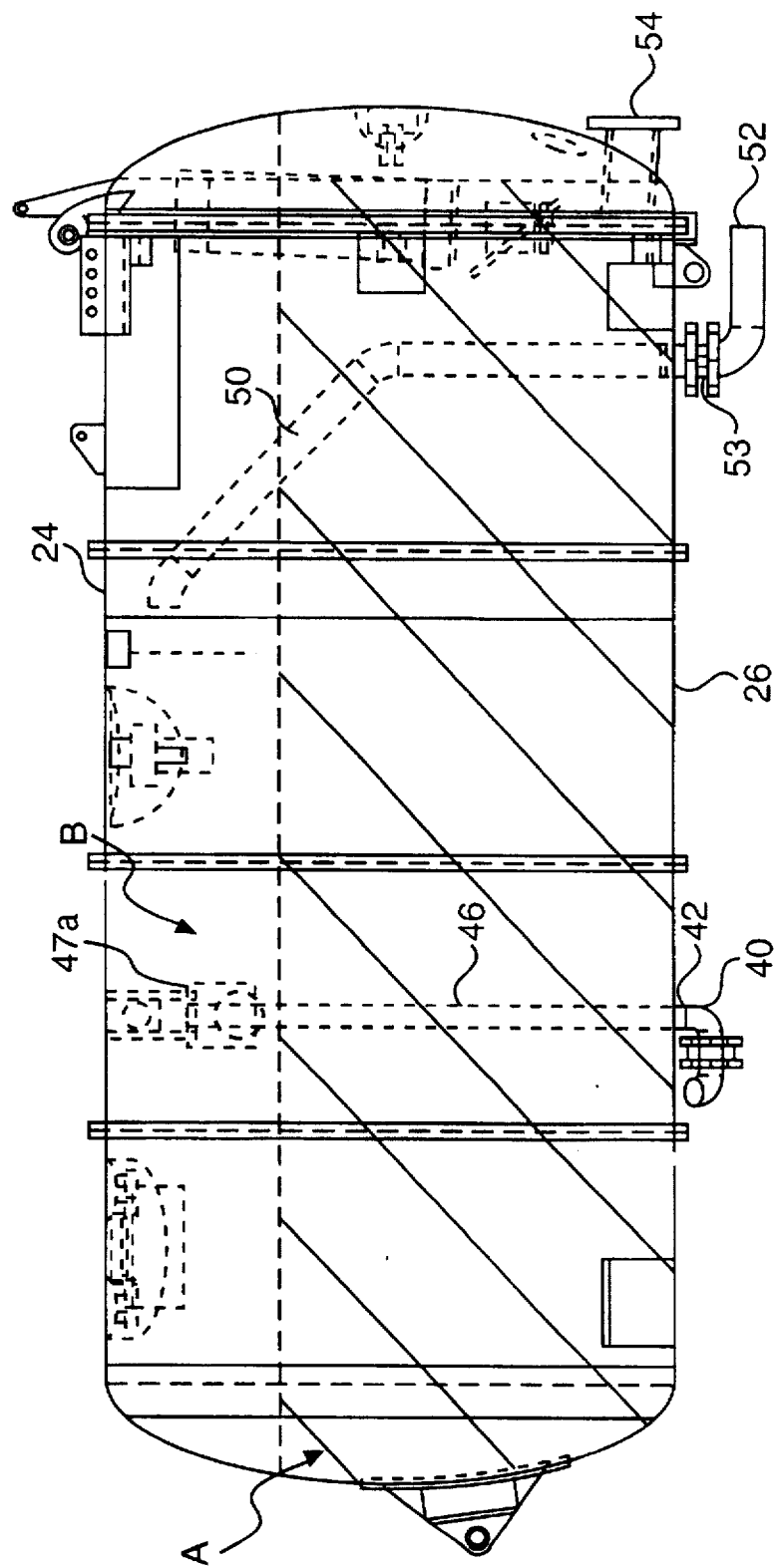
FIG. 3 is a side view of the tank of FIG. 1.

A preferred embodiment of the vehicle for transporting waste material is shown in FIGS. 1 and 2, and identified generally by reference numeral 10. The vehicle 10 includes a cab 12 seated on a chassis 14 defining a support bed 16 rearward of the cab 12. The support bed 16 preferably is a stationary platform. In a preferred embodiment, as shown in FIGS. 1-3, the support bed 16 includes hose trays 18 which project upward above the chassis 14.

In accordance with the invention, the waste material transportation vehicle comprises an enclosed tank or shell mounted on the support bed for receiving the material. As embodied herein and shown in FIGS. 1 and 2, a tank 20 is positioned on the support bed 16 and adapted to receive and transport material. The tank 20 includes an outer wall 22 and a containment zone A (see dashed and slanted parallel lines in FIGS. 1 and 3) for the material within the outer wall 22. The tank 20, which may be various shapes and sizes, preferably has a substantially cylindrical configuration having top, bottom and middle surfaces 24, 26, and 28. As embodied herein and shown principally in FIGS. 1 and 3, the top and bottom surfaces 24, 26 occupy the upper and lower thirds of the cylindrical tank 20. The middle surfaces 28 extend along either side of the circumference of the tank 20 between the top and bottom surfaces 24, 26. Inasmuch as the tank 20 may be various shapes, the bottom surface 26 may be planar or curved. In either case, the bottom surface 26 normally is positioned adjacent the support bed 16, as shown in FIG. 1.

In accordance with the present invention, the tank preferably is connected to the chassis for pivotal movement relative to the support bed. The tank also may be fixed to the chassis. As embodied herein and shown in FIG. 1, the back of the tank 20 preferably is attached to the vehicle 10 for movement about a pivot 30 at the rearward end of the chassis 16. In this embodiment, the front of the tank 20 is connected to means, such as a hydraulic lift 32, for raising the front of the tank 20.

Figure 8:
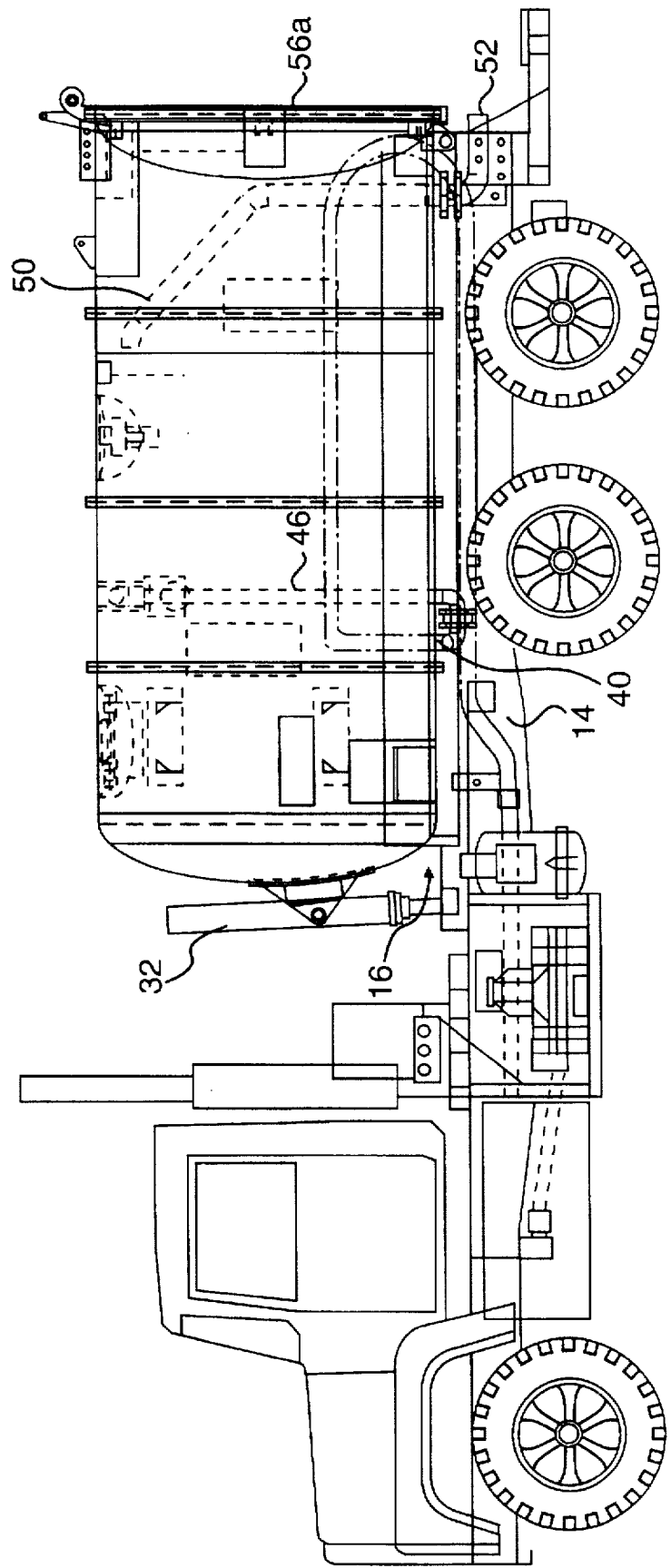
FIG. 8 is a side view of another embodiment of the vehicle of the present invention.

As embodied herein and shown in FIGS. 1 and 8, the bottom surface 26 of the tank 20 normally is seated within the support bed 16. Indeed, if the vehicle is transporting material on highways from one location to another, the tank 20 must be lowered. In accordance with the present invention, when the tank is lowered, sufficient clearance must be provided between the bottom surface 26 of the tank 20 and the support bed 16 to accommodate conduits protruding from the bottom of the tank, as later described.

Figure 4:
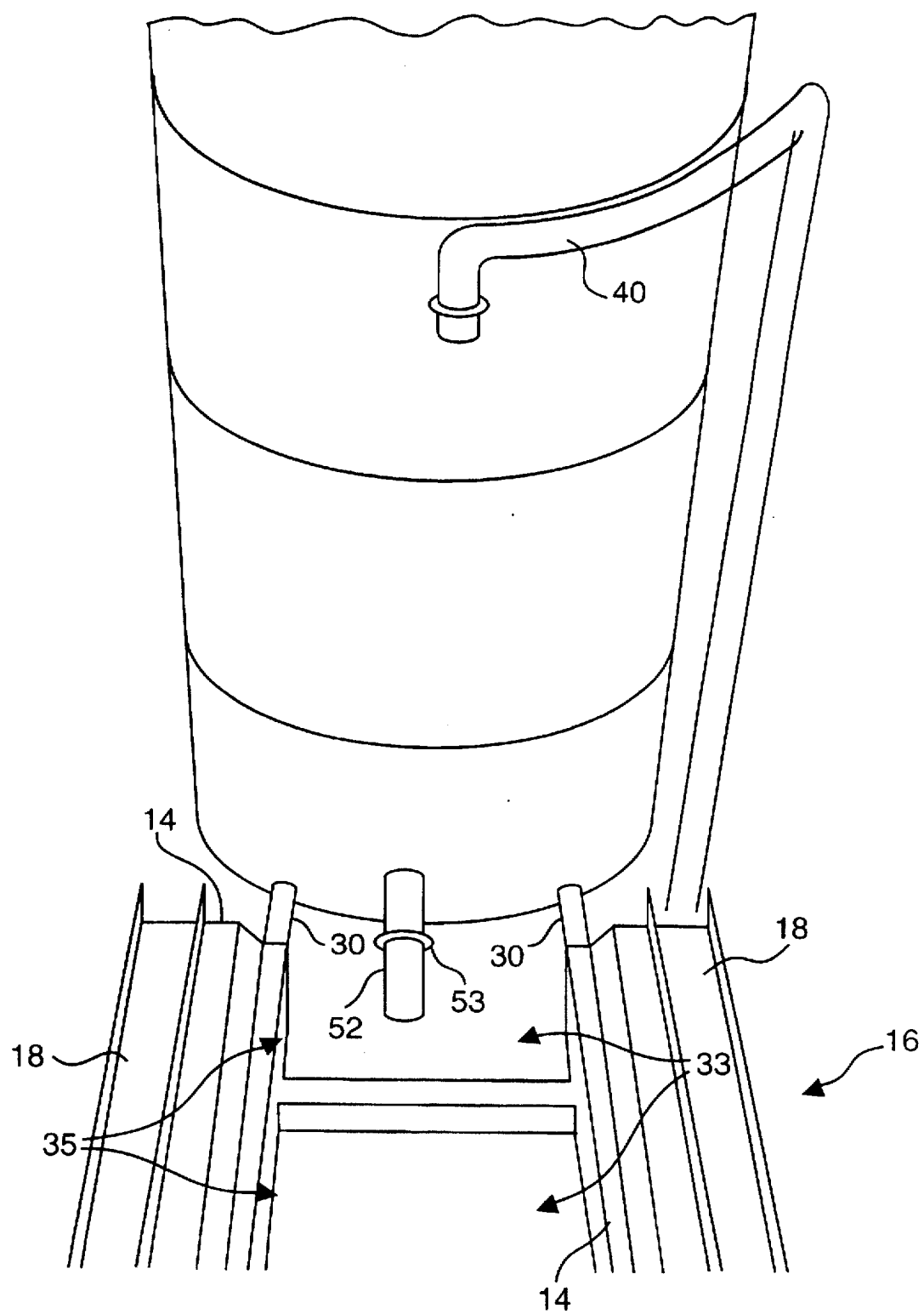
FIG. 4 is a perspective view of the raised tank in FIG. 2 viewed in the direction of the arrow identified by the letter "x."
Figure 5:
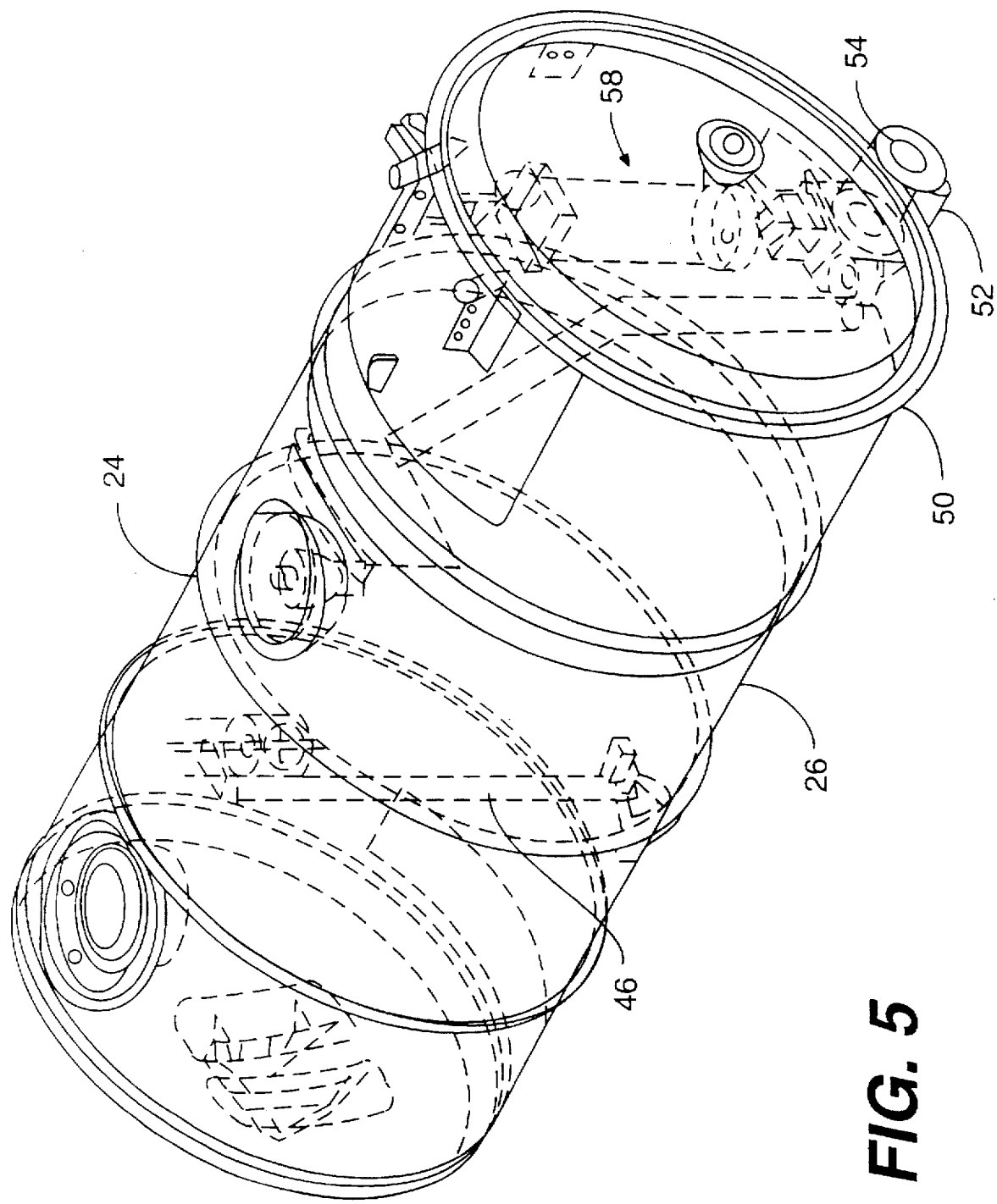
FIG. 5 is a perspective view of the tank shown in FIG. 3.

Preferably, as shown in FIG. 4, the support bed 16 includes open areas 33 between the chassis 14 and transverse support members, such as an axle 34, to receive the aforesaid conduits protruding from the bottom of the tank. Through this arrangement, the chassis 14 and the transverse support members provide a housing 35 at least partially surrounding the conduits when the conduits are disposed within the open areas. The housing 35 protects the conduits from damage arising from direct impact. Further, the open areas 33 provide spacing between the protruding conduits and the chassis 14 (the spacing typically may be about 6") to prevent damage to the conduits if the tank is moved slightly relative to the chassis 14, as may result from impact along the side of the vehicle, for example.

In accordance with the present invention, there is a system for generating pressure and vacuum disposed outside of the tank for use in selectively controlling pressure and vacuum within the tank. As embodied herein and shown in FIGS. 1, 2, and 8, the system preferably includes vacuum/pressure pump 36, which is connected to the tank 20 through an air conduit system.

In accordance with the present invention, the air conduit system provides fluid communication between the vacuum/pressure pump and the containment zone of the tank. As embodied herein and shown at various stages in FIGS. 1-5, the air conduit system 38 includes an external air conduit, which is identified by reference numeral 40 and may comprise a series of interconnected pipes or a continuous flexible duct, connecting the vacuum/pressure pump 36 to the tank 20. The external air conduit 40 enters the tank 20 through a port 42 along the bottom surface 26. The external air conduit 20, which protrudes from the port 42, is sheltered within the housing 35 when the tank 20 is seated in the support bed 16.

In accordance with the present invention, the tank is designed to receive, transport and discharge material which is held in the containment zone in the interior portion of the tank. As embodied herein and shown in FIG. 1, the containment zone A occupies a substantial portion of the interior of the tank 20, preferably the portion of the interior adjacent the bottom and middle surfaces 26, 28 of the tank 20. The portion of the tank interior between the containment zone A and the top surface of the tank 20 is referred to as a separation zone B.

Figure 7:
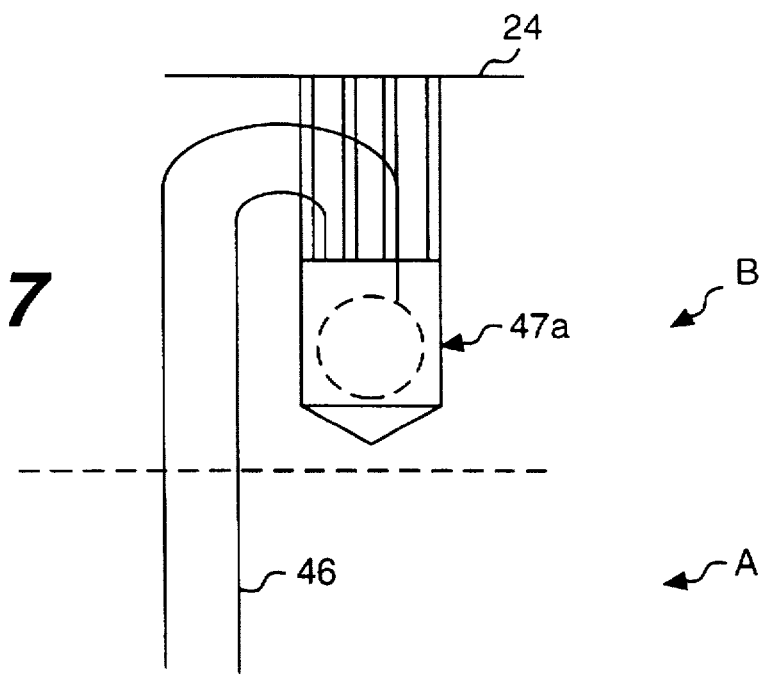
FIG. 7 is a side view of the internal air conduit shown in FIGS. 1-3.

In accordance with the present invention, the air conduit system includes an internal air conduit in fluid communication with the external air conduit. As embodied herein and shown principally in FIGS. 3, 5, and 7, the air conduit system 38 comprises an internal air conduit 46 which extends from the port 42 on the bottom surface 26 of the tank to the separation zone B. The air conduit system includes a primary shutoff device 47a, such as a ball valve, in the separation zone B to provide overfill protection, thereby preventing material from entering the internal air conduit 46, as shown in FIG. 7. A secondary shutoff device 47b is located near the pressure control device 36 for backup protection.

In accordance with the present invention, there is provided a loading system for drawing material into the tank in response to vacuum created in the tank. As embodied herein and shown together in FIGS. 1-5, the loading system 48 includes an internal waste conduit 50 extending from the bottom surface 26 of the tank 20 to the separation zone B. The internal waste conduit 50 is in fluid communication with an external waste conduit 52 protruding from the bottom surface 26 and extending within the open areas 33. The external waste conduit 50, which generally does not extend beyond a rearward portion of the tank 20, is designed to accommodate a flexible conduit hookup or the like at job sites. The external waste conduit 50 includes a control valve 53, which typically defines an opening of about 4" in diameter.

In accordance with the present invention, there also is provided a waste discharge system. As embodied herein and shown in FIG. 2, the waste discharge system includes a discharge outlet 54 mounted on a pivotable tailgate 56. Waste material primarily is expelled through the discharge outlet 54 in response to internal tank pressure created by the pressure control device 36. The tank 20 also may be raised and the tailgate 56 opened or closed to discharge residual material that is not expelled through the discharge outlet 54.

Figure 6:
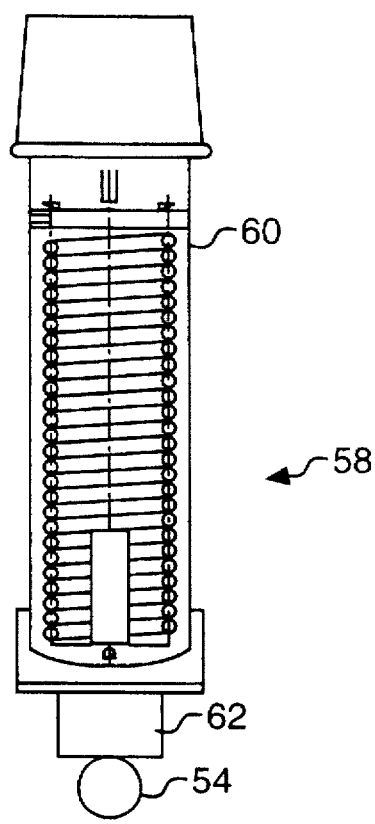
FIG. 6 is a perspective view of the air actuated valve shown principally on the rear door of the tank in FIG. 3.

In accordance with the present invention, the discharge outlet preferably is controlled by an air-actuated, corrosion resistant valve mounted inside the tank. As embodied herein and shown principally in FIGS. 5 and 6, an air-actuated valve 58 having a spring member 60 and stainless steel gate 62 is mounted on the rear tailgate 56 along the interior of the tank 20. When material is not being discharged from the discharge outlet 54, the spring member 60 holds the gate 62 in a closed position. Pressurized air (air supply lines not shown) may be used to open the valve, which preferably has a diameter of approximately 6". As embodied herein, the waste discharge system also includes a manual control valve (not shown), which is disposed outside the tank 20 along the discharge outlet 54.

Additional features of the present invention include manways 64 and relief valve 66 having inverted heads, as shown principally in FIGS. 1 and 8. Accordingly, the manways 64 and relief valve 66 do not protrude from the top of the tank 24. Further, level indicators 68 may be disposed on the interior of the tailgate 56, further eliminating control mechanisms extending along the exposed external surface of the tank 20.

In the embodiment of the present invention shown in FIG. 8, the tailgate is reversed so that it provides an unobtrusive substantially planar surface along the exterior of the tank.

In operation, the vehicle 10 of the present invention is intended to remove waste material from one location and transport and deposit the waste material at another location. To fill the tank 20, the vehicle 10 is positioned substantially adjacent the waste material. Flexible piping (not shown) is attached to the external waste conduit 52 depending from the bottom surface 26 of the tank 20. Once, the vacuum pump generates sufficient vacuum within the tank, the control valve 53 for the external waste conduit is opened, so that the waste material is drawn through the flexible piping (not shown), the waste conduits 50, 52 and into the tank 16. During this procedure the tank 20 may be lowered and seated within the support bed 16 of the vehicle 10 or the tank 20 may be in a raised position. Once the loading process is completed, the material is transported to another location, either to pickup additional material or to discharge the contents of the tank.

For discharging the tank, the operation of the vacuum/pressure pump is reversed and pressure is built up within the tank. Once the tank is pressurized, the outlet near the base of the tailgate is opened and the waste is passed out of the tank. Any residual waste typically is withdrawn by raising the front end of the tank, in which case the waste material either passes through the discharge outlet or through the rear end of the tank if the tailgate is open.

Additional advantages and modifications will readily occur to those skilled in the art. The invention in its broader aspects is, therefore, not limited to the specific details, representative apparatus and illustrative examples shown and described. Accordingly, departures may be made from such details without departing from the scope of the general inventive concept as defined by the appended claims and their equivalents.

What is claimed:

1. A vehicle for transporting waste material comprising:
   a support bed;
   a tank mounted above said support bed for receiving the waste material, said tank including an outer wall and a containment zone for the material within said outer wall, said outer wall having top and bottom surfaces, said bottom surface normally disposed substantially adjacent said support bed, said top surface and said containment zone defining a separation zone therebetween;
   a system for generating vacuum and pressure disposed externally of said tank for alternately controlling vacuum and pressure within said tank;
   an air conduit system providing fluid communication between said vacuum and pressure generating system and said containment zone of said tank, said air conduit system including an external air conduit connecting said tank to said vacuum and pressure generating system, said external air conduit connected to said bottom surface, said air conduit system also including an internal air conduit in fluid communication with said external air conduit, said internal air conduit extending from said bottom surface to said separation zone;
   a waste loading system for drawing waste material into said tank in response to vacuum created in said tank, said waste loading system including an external waste conduit connected to said bottom of said tank, said waste loading system also including an internal waste conduit in fluid communication with said external waste conduit, said internal waste conduit extending from said bottom surface to said separation zone; and
   a waste discharge system for expelling waste material from said tank.

2. The vehicle as defined in claim 1, wherein said external air conduit and said external waste conduit protrude from said bottom surface of said tank.

3. The vehicle as defined in claim 2, wherein said support bed includes a housing substantially surrounding said external air conduit and said internal air conduit when said tank is lowered and disposed substantially adjacent said support bed.

4. The vehicle as defined in claim 2, wherein said support bed includes open areas for receiving said external air conduit and said internal air conduit when said tank is lowered and disposed substantially adjacent said support bed.

5. The vehicle as defined in claim 1, wherein said waste discharge system includes a discharge outlet and an air-actuated valve along an interior portion of said tank for controlling the opening and closing of said discharge outlet.

6. The vehicle as defined in claim 1, wherein said tank includes recessed manways along said top surface.

7. The vehicle as defined in claim 1, wherein said tank includes manways extending into said tank to provide a substantially smooth contour along said outer wall at said manway.

8. The vehicle as defined in claim 1, wherein said system for generating vacuum and pressure within said tank includes a vacuum/pressure pump.

9. The vehicle as defined in claim 1, wherein said bottom surface is curved.

10. The vehicle as defined in claim 1, wherein said bottom surface is substantially planar.

11. The surface vehicle as defined in claim 1, wherein said tank is substantially cylindrical and said bottom surface occupies a bottom one third of the circumference of said tank.

12. The vehicle as defined in claim 1, wherein said tank includes a tailgate pivotally connected along said upper surface.

13. The vehicle as defined in claim 1, wherein said tank includes a welded rear head.

14. The vehicle as defined in claim 1, wherein said tank is pivotally mounted on said support bed along said bottom surface.

15. The vehicle as defined in claim 14, also including a hydraulic lift connected at one end of said tank for raising and lowering said tank relative to said bottom surface.

16. The vehicle as defined in claim 1, wherein said internal air conduit includes a series of interconnected pipes.

17. The vehicle as defined in claim 1, wherein said external air conduit includes a series of interconnected pipes.

18. The vehicle as defined in claim 1, wherein said internal waste conduit includes a series of interconnected pipes.

19. The vehicle as defined in claim 1, wherein said external waste conduit includes a series of interconnected pipes.

20. The vehicle as defined in claim 1, wherein said air conduit system includes at least one shutoff valve connected to said internal air conduit to prevent material from flowing into said pressure control device.

21. The vehicle as defined in claim 19, wherein said at least one shutoff valve is located within said separation zone.

22. The vehicle as defined in claim 1, wherein said tank includes a relief valve along said top surface for relieving excess pressure within said tank, said relief valve projecting into said separation zone to provide a substantially smooth contour along said outer wall.

* * * * *